Feb. 9, 1960  R. W. McANALLY  2,924,404
ACTUATING DEVICE
Filed July 31, 1956  2 Sheets-Sheet 2
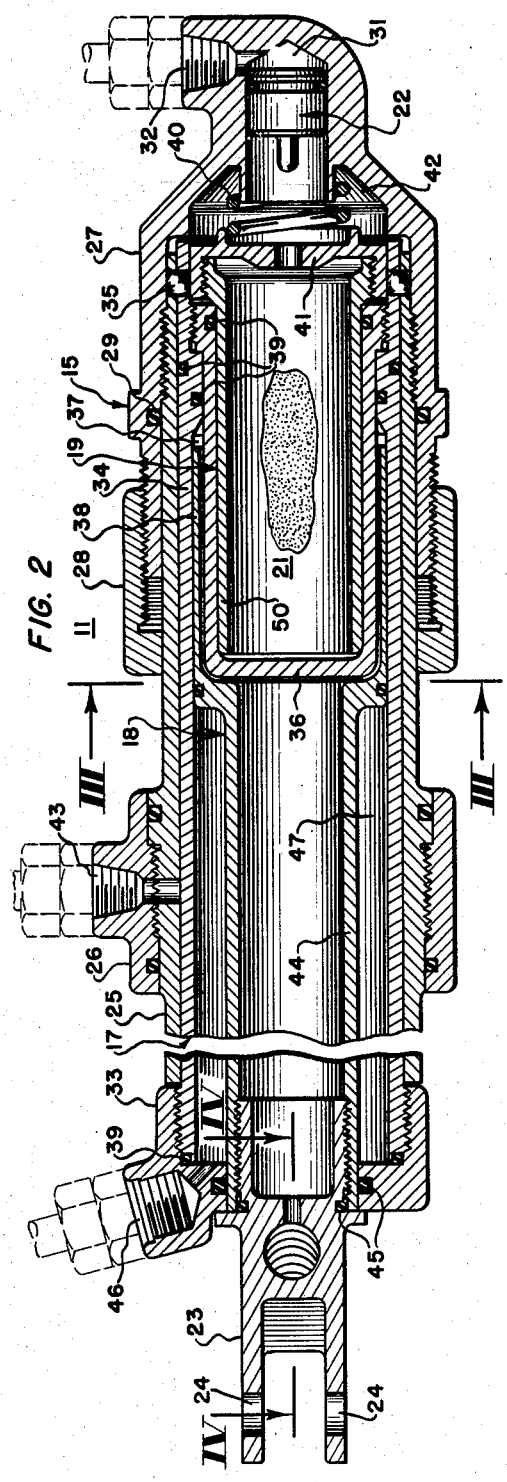
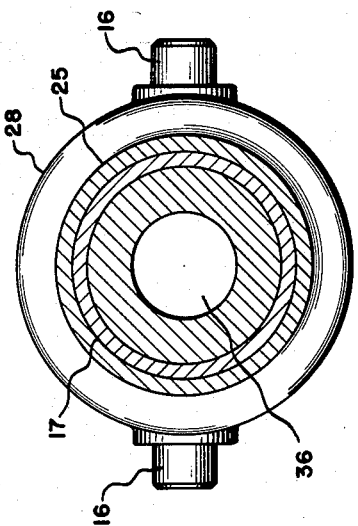
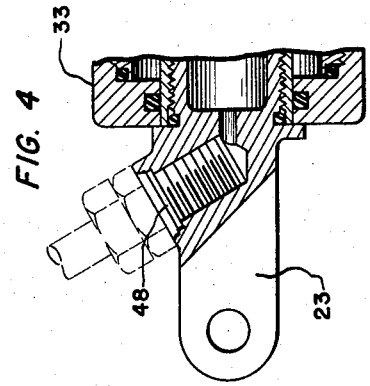
INVENTOR.
ROBERT W. McANALLY
BY
ATTORNEY United States Patent Office 2,924,404
Patented Feb. 9, 1960

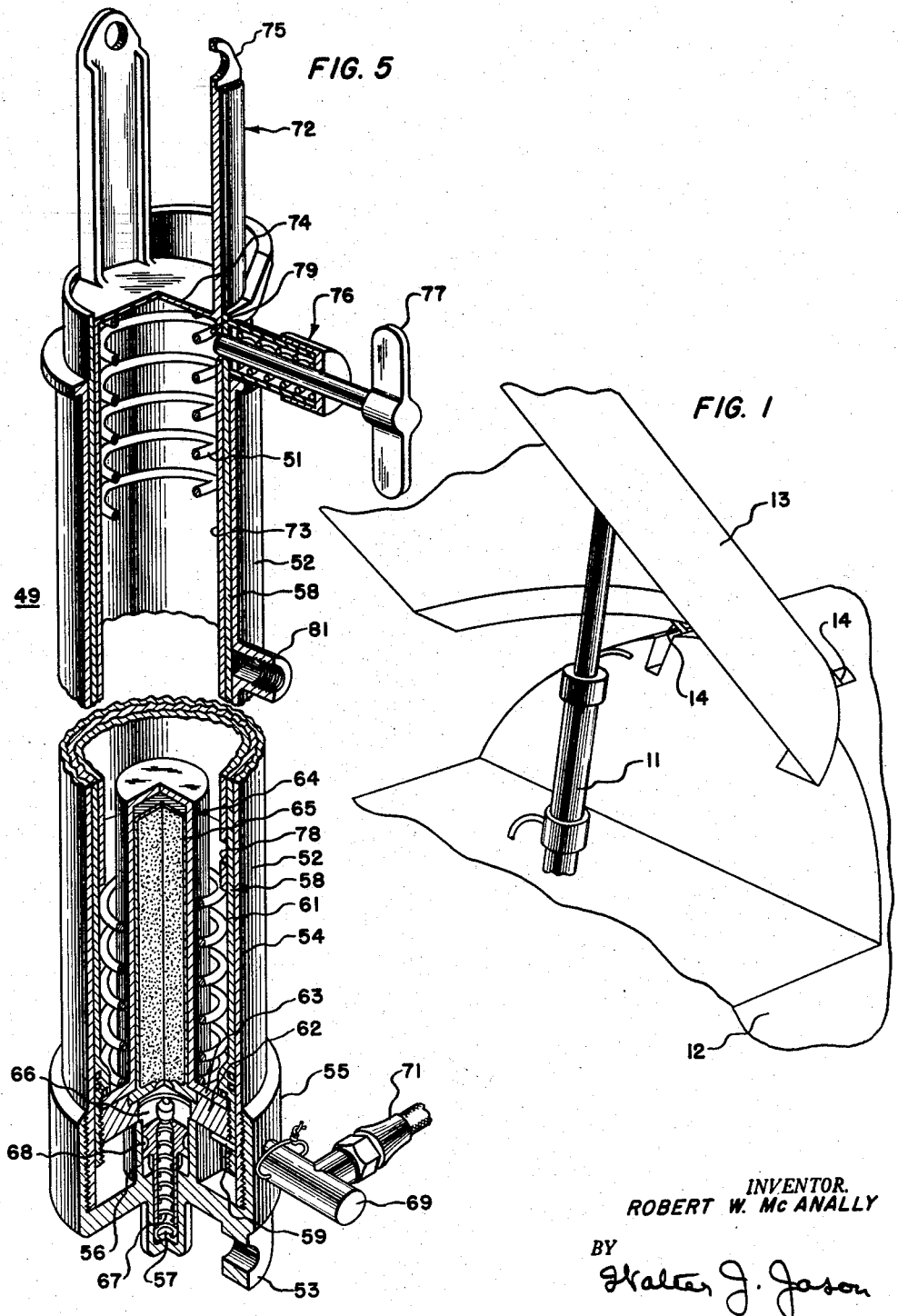

2,924,404
ACTUATING DEVICE

Robert W. McAnally, Fort Worth, Tex., assignor to General Dynamics Corporation, San Diego, Calif., a corporation of Delaware Application July 31, 1956, Serial No. 601,299

6 Claims. (Cl. 244—121)

The present invention relates to actuating devices, and more particularly to an improved actuating device which is normally operable to permit relative movement between a fixed member and a movable member, and which is selectively actuable to forcibly move the movable member away from the fixed member.

Certain aircraft components, such as the aircraft canopy, door, or landing gear, must be repeatedly operated, and, by reason of their size and weight, such operation is generally through power actuators or, at the least, manually with the assistance of power actuators. An example of the latter is found in the opening and closing of an aircraft canopy. This manual operation is assisted by the usual provision of a pneumatic or hydraulic actuator cylinder for counterbalancing the weight of the canopy, and by this means an aircraft crew member can easily manage the opening or closing operation during entrance and exit.

In certain emergency situations, as, for example, where there has been a failure of the landing gear hydraulic system, or where jettisoning of an aircraft canopy or hatch is necessary to permit escape, there has heretofore been provided a separate emergency actuator for accomplishing the emergency function. This actuator, generally an explosive or pneumatic cartridge type, was duplicative of the power actuators employed for normal operation of the aircraft components, and the duplication of mechanism required undesirable increases in size and weight of the aircraft.

Accordingly, the present invention provides a unique power actuating device which embodies both a cartridge actuated emergency mechanism and a fluid or spring operated mechanism for normal operating requirements. The invention is particularly adapted to assist in achieving relative movement between the canopy and fuselage of an aircraft, and in jettisoning the canopy in an emergency situation. Thus, in a single device there is provided a composite structure capable of achieving both the normal operation of the canopy and the emergency operation of the canopy, eliminating the duplication of mechanisms required by the prior art to accomplish the same result. The space and weight thereby saved are critical items in aircraft, and the consequent advantages of the present invention will therefore be apparent. In addition, the provision of an integral cartridge achieves reliable and immediate separation or jettisoning of the aircraft canopy, and in an easily initiated and quickly accomplished action, as will be seen.

It is to be understood, of course, that the direction of the discussion and description herein to aircraft components, and aircraft canopies in particular, is not intended to be limiting since the present actuator device is readily susceptible of various applications wherein there is required the combination of functions and structures which is afforded by the device of the present invention.

Therefore, it is an object of the present invention to provide a novel actuating device which is adapted to provide counter-balanced relative movement between a fixed member and a movable member, and which is also adapted to be actuated to effect quick and forcible movement of said movable member away from said fixed member.

A further object of the invention is to provide an improved actuating device which is adapted not only to assist in effecting raising and lowering of an aircraft canopy, but also is adapted to explosively jettison the canopy.

A still further object of the invention resides in the provision of a unique composite actuator device that is easily controllable, relatively simple in operation, and reliable.

Other objects and features of the present invention will be readily apparent to those skilled in the art from the following specification and appended drawings wherein is illustrated a preferred form of the invention, and in which:

Figure 1 is a partial perspective view of an actuator device of the present invention illustrated in connection with an aircraft canopy;

Figure 2 is a longitudinal view in cross section of the actuator device of Figure 1;

Figure 3 is a view taken along III—III of Figure 2;

Figure 4 is a detail view in cross section taken along IV—IV of Figure 2; and

Figure 5 is a cut-away perspective view of a second embodiment of the present invention.

Referring now to the drawings, and in particular to Figures 1 and 2, there is illustrated an actuating device 11 which is adapted for connection between the fuselage 12 of an aircraft and a usual hinged canopy 13 of such aircraft, and which serves upon opening and closing of canopy 13 to counterbalance the weight thereof, and which also serves to forcibly eject or jettison canopy 13 in emergency situations. The manner in which device 11 is secured to fuselage 12 at its lower end and to canopy 13 at its upper end is not important to the present invention and therefore such mounting arrangement will not be described in detail other than to note that the mounting is pivotable. Further, canopy 13 is pivoted in the usual manner at its rearward end to fuselage 12 at hinge assemblies 14, and since the precise construction of hinges 14 and the manner of their interconnection between canopy 13 and fuselage 12 is also not important to the present invention, a detailed description thereof will be omitted for brevity.

Actuating device 11, which is shown in its extended position in Figure 1 and in its retracted position in Figure 2, comprises, generally, an external cylinder or body 15 which is pivotally carried by fuselage 12 at a pair of trunnions 16, Figure 3; an internal sleeve or cylinder 17 which is slidable longitudinally within body 15 during emergency operation of device 11; a piston 18 longitudinally slidable within internal cylinder 17 during normal opening and closing of canopy 13; a cartridge holder 19 nested within the right end (as viewed in Figure 2) of internal cylinder 17; a conventional explosive cartridge 21 carried within holder 19; and a usual firing pin 22 slidably disposed within the right end of body 15 and in axial alignment with cartridge 21. At its left end actuating device 11 is provided with a clevis element 23 which is provided with a pair of aligned openings 24 for pivotal accommodation of a bolt (not shown) of the mounting assembly of canopy 13. Thus, actuating device 11 is pivotally mounted at trunnions 16 to fuselage 12, and at clevis 23 to canopy 13, and arranged as illustrated whereby the extension of piston 18 serves to raise canopy 13 and conversely the retraction of piston 18 serves to lower canopy 13. In addition, as will become apparent hereinafter, the explosion of cartridge 21 acts to urge cartridge holder 19, internal cylinder 17 and piston 18 outwardly or to the left, as viewed in Figure 2, thereby forcing canopy 13 upwardly, separating canopy 13 from fuselage 12.

Main body 15 of actuating device 11 comprises, generally, a longitudinally extending sleeve element 25 whose inner surface serves in effect as a cylinder for the piston action of internal cylinder 17 during emergency ejection of cylinder 17, sleeve element 25 being peripherally threaded to receive an internally threaded collar 26; a head or end portion 27 threadably secured to the right end of sleeve element 25; and a collar 28 threadably secured to the left end of end portion 27. A plurality of sealing rings 29 are provided between the components of body 15 to provide a fluid tight interconnection therebetween. Portion 27 is internally bored at its right end to form a chamber 31 within which firing pin 22 is slidable, and a port 32 is provided adjacent thereto in portion 27 to afford a means for introducing fluid pressure within the right end of chamber 31 to thereby drive firing pin 22 to the left for the actuation or explosion of cartridge 21.

Internal cylinder 17, which is slidable within body 15 during the ejection operation, is of three part construction and includes a left end portion 33 threadably secured to the left end of a sleeve 34 which is normally held in locked or fixed relationship with respect to sleeve element 25 of body 15 by a plurality of balls 35 carried within aligned openings provided in sleeve element 25 and sleeve 34. It will be apparent that the provision of balls 35 normally prevents relative movement between sleeves 25 and 34, and that ejection of internal cylinder 17 from body 15 cannot occur until balls 35 are moved out of interfering relationship therebetween. The third part of internal cylinder 17 is a housing element 36 which serves to enclose the greater portion of cartridge holder 19, housing 36 being externally threaded at its open right end for threaded connection to internal threads provided on the right end of sleeve 34. Housing 36 extends to the left in spaced relationship with sleeve 34 to form an annular chamber 37 within which a skirt 38 of piston 18 is operable, as will be seen. Housing 36 is closed at its left end so that the expanding gases of exploding cartridge 21 will serve to act thereagainst and drive internal cylinder 17 to the left. A plurality of sealing rings 39 are provided, as illustrated, to effect a fluid tight relationship between the components of internal cylinder 17 and between cylinder 17, body 15, and cartridge holder 19.

Cartridge holder 19 includes a skirt 50, which is slidably nested within housing 36, and an end portion 41 which is threadably secured to skirt 50. End portion 41 is longitudinally slidable within the right end of sleeve 34 and within a hollowed-out internal chamber 42 of end portion 27, a portion of chamber 42 serving in effect as an extension of the sleeve 34.

In its left or locked position, end portion 41 serves to maintain balls 35 in their locking positions, and this locked position of end portion 41 is normally maintained through the bias of a helical spring 40 carried within chamber 42, as illustrated, and acting against end portion 41. It will be noted, however, that upon explosion of cartridge 21 the expanding gases will act against end portion 41 and drive it to the right within chamber 42 and against the bias of spring 40, and out of locking position to permit balls 35 to drop inwardly out of their locking relationship between sleeves 25 and 34. Continuing expansion of the gases generated by the explosion of cartridge 21 will act against the left hand of housing 36, urging the whole of internal cylinder 17 to the left whereby forcible ejection of piston 18 is achieved. It is to be noted that as the right end of sleeve 34 passes collar 26 a port 43 of collar 26 is uncovered and the expanding gases are permitted in part to pass through port 43. By this means actuating device 11 is also adapted to serve an auxiliary purpose in providing a source of pneumatic pressure substantially simultaneous with the actuation or release of canopy 13.

Piston 18, which is normally the movable member during opening and closing of canopy 13, is formed in a reduced diameter middle portion 44 which is integral at its right end with skirt 38, and which is threadably secured at its left end to clevis element 23. A plurality of sealing rings 45 are provided to effect a sealing relation between the components of piston 18 and between piston 18 and internal cylinder 17.

End portion 33 of internal cylinder 17 is provided with a port 46 for admitting fluid pressure to an annular chamber 47 formed between sleeve element 25 of internal cylinder 17 and middle portion 44 of piston 18 whereby piston 18 may be driven inwardly or to the right, as viewed in Figure 2. Similarly, as seen in Figure 4, clevis 23 is provided with an integral port 48 for admitting fluid pressure to the hollow interior of piston 18 whereby piston 18 may be urged outwardly or to the left, the action of fluid pressure within piston 18 being such as to oppose the action of the fluid pressure within annular chamber 47. It will be apparent that by adjusting the effective pressure areas against which the pressure acts in chamber 47 and in piston 18, the weight of canopy 13 urging piston 18 inwardly may be balanced. In this event there may be used a common source of fluid pressure for both ports 46 and 48, although it is also apparent that the amount of pressure admitted to either port 46 or 48 may be adjusted so that regardless of the effective pressure areas the canopy 13 is properly counterbalanced or, for that matter, urged in one direction appreciably more than in another direction.

A second embodiment of the present invention, herein generally referred to as device 49, Figure 5, is essentially similar to device 11 just described, except that the portions of device 11 which utilize differential pressures for counterbalancing are replaced by a helical spring 51 whose spring constant may be chosen to afford the desired counterbalancing action for canopy 13.

Actuating device 49 comprises generally an outer cylinder or body 52, which is pivotally mounted to fuselage 12 at a depending ear or projection 53. Body 52 includes a middle or sleeve portion 54 which is threadably secured at its lower end, as viewed in Figure 5, to a base portion 55 which serves to close the lower end of body 52 and which is formed to define a central and axially extending cylinder element 56 open at its upper end and provided with a bore 57 through its closed end.

An internal cylinder 58 is carried within sleeve portion 54 of body 52 in locked relationship therewith by reason of the disposition of a shear pin 59 through normally aligned openings (not shown) in internal cylinder 58 and body 52. It is noted, however, that internal cylinder 58 is adapted for slidable axial movement within sleeve portion 54 in the absence of the restraining influence of pin 59. Internal cylinder 58 includes a sleeve 61 adapted for slidable cooperation with sleeve portion 54 in the event just described, and also includes a base portion 62 threadably secured to the lower end of sleeve 61 and normally resting upon the upper edge of the wall of cylinder element 56, base portion 62 being provided with a central aperture which in effect forms a continuation of the internal surface of cylinder element 56. Between the lower portion of sleeve 61 and base portion 62 there is rigidly held a peripheral foot or flange 63 of an axially extending cartridge holder 64. Also, a cartridge 65 is nested within holder 64 and includes a peripheral flange which is rigidly held between flange 63 of holder 64 and base portion 62 of cylinder 58. It will be apparent that there is thus formed an integral assembly of cylinder 58, cartridge holder 64 and cartridge 65, each of which components is immovable relative to each other, and normally immovable with respect to outer body 52.

Slidable within the interior of cylinder element 56 and bore 57 of body 52 is a firing pin 66 which is biased in upward direction by a helical spring 67 housed within an internal bore of firing pin 66. Pin 66, however, is normally restrained against upward movement by reason of the projection of shear pin 59 through the wall of element 56 and into an annular groove 68 provided in the periphery of firing pin 66, as illustrated.

Mounted to base portion 55 is an extractor assembly 69 which embodies a piston (not shown) secured to pin 59 and slidable outwardly upon the introduction of fluid pressure into assembly 69 through a conduit 71, as illustrated. This movement of the piston and of assembly 69 moves shear pin 59 out of annular groove 68 of firing pin 66, and spring 67 drives firing pin 66 upwardly against cartridge 65. The expanding gases of exploded cartridge 65 will then drive cartridge holder 64 and internal cylinder 58 upwardly, shearing pin 59 in the process. The operation just described is thus effective to raise canopy 13 and separate it from fuselage 12.

Normal manual opening and closing of canopy 13 is assisted by actuating device 49 through the counterbalancing effect of an internal piston 72, which piston 72 includes a skirt section 73 axially slidable within internal cylinder 58; an upper wall 74; and a clevis member 75 which is pivotally mounted to canopy 13. Skirt section 73 and upper wall 74 form an enclosure for spring 51 and it will be apparent that the action of spring 51 against wall 74 will tend to extend piston 72 out of cylinder 58, thereby raising canopy 13. In this manner the action of spring 51 serves to counterbalance the weight of canopy 13, and the bias of spring 51 is preferably chosen such that the weight of canopy 13 is just balanced.

A latch assembly 76, carried at the upper end of cylinder 58, includes a spring bias latch element 77, which passes through an opening in the upper end of cylinder 58, and which serves to maintain the canopy in raised or lowered position by engagement of element 77 with latch holes 78 and 79, respectively, provided in skirt section 73 of internal piston 72.

A port 81, similar to port 43 of the first embodiment, is provided in body 52 and serves during the ejection operation to vent a portion of the expanding gases of cartridge 65, thereby providing a source of pneumatic pressure substantially simultaneous with the ejection of canopy 13 since gases cannot pass through port 81 until internal cylinder 58 has passed beyond port 81.

From the above it will be apparent that the present invention provides an actuating device which is effective to provide a counterbalancing action during normal operation of a movable element such as an aircraft canopy, and which is operative in an emergency to effect quick and forcible movement of such movable element when desired. This combination of functions and structure within one device produces a compact and lightweight structure relatively simple in construction and which is reliable in operation.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. An actuating device adapted for interconnection between a fixed structure and a movable structure which is movably mounted to said fixed structure, said device comprising a cylindrical housing having an open end and adapted for connection to said fixed structure, a cylinder member carried within and capable of sliding movement out of the open end of said housing, locking means operative to normally prevent said sliding movement of said cylinder member and adapted to be rendered inoperative to thereby permit said sliding movement, a piston element slidably carried and normally freely reciprocable within said cylinder member and adapted for connection to said movable structure whereby reciprocable movement of said piston element effects normal movement of said movable structure, said piston element being movable by said cylinder member upon sliding movement of said cylinder member in an emergency, and ejection means carried within said housing and including a cartridge source of pressurized gases carried within said cylinder member and slidably positioned adjacent said locking means for holding said locking means in operative position, and a firing pin actuable in an emergency for striking said cartridge source to release said gases and move said cartridge source slidably out of adjacency with said locking means to render said locking means inoperative and effect said slidable movement of said cylinder member relative to said housing whereby there occurs emergency movement of said piston element and consequent emergency movement of said movable structure.

2. An actuating device adapted for interconnection between a fixed structure and a movable structure which is pivotally mounted to said fixed structure for movement toward and away from said fixed structure, said device comprising a cylindrical housing having an open end and adapted for connection to said fixed structure, a cylinder member carried within and capable of sliding movement out of the open end of said housing, locking means operative to normally prevent said sliding movement of said cylinder member and adapted to be rendered inoperative to thereby permit said sliding movement, a piston element slidably carried and normally freely reciprocable within said cylinder member and adapted for connection to said movable structure whereby reciprocable movement of said piston element effects normal pivotal movement of said movable structure toward and away from said fixed structure, said piston element being engageable for movement by said cylinder member upon sliding movement of said cylinder member in an emergency, and ejection means carried within said housing and including a cartridge source of pressurized gases carried within said cylinder member and slidably positioned adjacent said locking means for holding said locking means in operative position, said ejection means also including a firing pin axially slidable within said cylindrical housing and actuable in an emergency for striking said cartridge source to effect release of said gases and move said cartridge source slidably out of adjacency with said locking means to render said locking means inoperative and effect said slidable movement of said cylinder member relative to said housing whereby there occurs emergency movement of said piston element and consequent emergency movement of said movable structure.

3. An actuating device adapted for interconnection between a fixed structure and a movable structure which is pivotally mounted to said fixed structure, said device comprising a cylindrical housing having an open end and adapted for connection to said fixed structure, a cylinder member carried within and capable of sliding movement out of the open end of said housing, locking means operative to normally prevent said sliding movement of said cylinder member and adapted for movement to inoperative position to thereby permit said sliding movement, a piston element slidably carried within said cylinder member and adapted for connection to said movable structure whereby movement of said piston element effects normal pivotal movement of said movable structure, said piston element being engageable for movement by said cylinder member upon sliding movement of said cylinder member in an emergency, a cartridge holder carried within said cylinder member and slidably positioned adjacent said locking means for holding said locking means in operative position, a cartridge in said cartridge holder, said cartridge being a source of pressurized gases, and a firing pin actuable in an emergency for striking said cartridge to release said gases whereby said cartridge holder is slidably moved out of adjacency with said locking means to permit said locking means to move to inoperative position, said slidable movement of said cylinder member relative to said housing being effected thereby to cause emergency movement of said piston element and consequent emergency movement of said movable structure.

4. An actuating device for a first element which is movably mounted upon a second element, said device comprising a housing having an open end and connected to said second element, a cylinder member carried within and capable of sliding movement out of the open end of said housing, a plurality of ball elements carried in normally aligned openings provided in said cylinder member and said housing to normally prevent sliding movement therebetween, said ball elements being adapted for movement out of said openings to thereby permit said sliding movement, a piston element slidably carried within said cylinder member and connected to said first element whereby movement of said piston element effects normal pivotal movement of said second element, said piston element being engageable for movement by said cylinder member upon sliding movement of said cylinder member in an emergency, and ejection means carried within said housing and including a cartridge source of pressurized gases carried within said cylinder member and slidably positioned adjacent said ball elements for holding said ball elements in said openings, and a firing pin actuable in an emergency for striking said cartridge source to release said gases and move said cartridge source slidably out of adjacency with said ball elements to effect movement of said ball elements out of said openings and also effect said slidable movement of said cylinder member relative to said housing whereby there occurs emergency movement of said piston element and consequent emergency movement of said first element.

5. An actuating device adapted for interconnection between a fixed structure and a movable structure which is pivotally mounted to said fixed structure, said device comprising a cylindrical housing having an open end and adapted for connection to said fixed structure, a cylinder member carried within and capable of sliding movement out of the open end of said housing, said cylinder member including an integral and internally located sleeve portion closed at one end, locking means operative to normally prevent said sliding movement of said cylinder member and adapted for movement to inoperative position to thereby permit said sliding movement, a piston element slidably carried within said cylinder member and adapted for connection to said movable structure whereby movement of said piston element effects normal pivotal movement of said movable structure, said piston element being engageable for movement by said sleeve portion of said cylinder member upon sliding movement of said cylinder member in an emergency, said piston element forming an annular chamber with said cylinder member, and forming an internal chamber with said sleeve portion of said cylinder member, said piston element being ported to admit fluid pressure into said annular chamber and said internal chamber whereby forces acting to move said piston element may be counterbalanced, a cartridge holder carried within said sleeve portion of said cylinder member and slidably positioned adjacent said locking means for holding said locking means in operative position, a cartridge in said cartridge holder, said cartridge being a source of pressurized gases, and a firing pin actuable in an emergency for striking said cartridge to release said gases whereby said cartridge holder is slidably moved out of adjacency with said locking means to permit said locking means to move to inoperative position, said slidable movement of said cylinder member relative to said housing being effected thereby to cause emergency movement of said piston element and consequent emergency movement of said movable structure.

6. An actuating device interconnected between an aircraft fuselage and a canopy pivotally mounted to said fuselage and adapted to be released by fluid pressure, said device comprising a cylindrical housing connected to the aircraft fuselage, said housing having an open end and a fluid pressure port in a wall thereof, a cylinder member carried within and capable of sliding movement out of the open end of said housing, locking means operative to normally prevent said sliding movement of said cylinder member and adapted for movement to inoperative position to thereby permit said sliding movement, a piston element slidably carried within said cylinder member and connected to said aircraft canopy whereby movement of said piston element effects normal pivotal movement of said aircraft canopy, said piston element being engageable for movement by said cylinder member upon sliding movement of said cylinder member for jettisoning said aircraft canopy, a cartridge holder carried within said cylinder member and slidably positioned adjacent said locking means for holding said locking means in operative position, an explosive cartridge in said cartridge holder, said cartridge being a source of pressurized gases, and a firing pin piston actuable for movement to strike said explosive cartridge to release said gases whereby said cartridge holder is slidably moved out of adjacency with said locking means to permit said locking means to move to inoperative position, said slidable movement of said cylinder member relative to said housing being effected thereby to cause movement of said piston element and consequent jettisoning of said aircraft canopy, said fluid pressure port of said housing being uncovered during said slidable movement thereby permitting a portion of said pressurized gases to escape and provide said fluid pressure, whereby initiation of release of said canopy may be had substantially simultaneously with the exit of said cylinder member from said housing.

References Cited in the file of this patent
UNITED STATES PATENTS

| | | |
|---|---|---|
| 2,479,713 | Beach | Aug. 23, 1949 |
| 2,489,984 | Shoemaker | Nov. 29, 1949 |
| 2,726,576 | Musser | Dec. 13, 1955 |
| 2,736,236 | Martin | Feb. 28, 1956 |